United States Patent [19]

Minko

[11] Patent Number: 4,915,489
[45] Date of Patent: Apr. 10, 1990

[54] PRISM WITH INTERNAL REFLECTOR

[76] Inventor: Robert Minko, 12945 Beresford, Sterling Heights, Mich. 48078

[21] Appl. No.: 227,047

[22] Filed: Aug. 1, 1988

[51] Int. Cl.⁴ .............................................. G02B 5/04
[52] U.S. Cl. .................................... 350/286; 350/618
[58] Field of Search ............. 350/286, 287, 169, 170, 350/618, 619, 620, 622, 628, 171

[56] References Cited

U.S. PATENT DOCUMENTS

| | | | |
|---|---|---|---|
| 1,467,213 | 9/1923 | Wessely et al. | 350/618 |
| 2,457,253 | 12/1948 | Martin | 350/620 |
| 4,595,833 | 6/1986 | Sting | 350/620 |

FOREIGN PATENT DOCUMENTS

| | | | |
|---|---|---|---|
| 53888 | 11/1967 | German Democratic Rep. | 350/286 |
| 29282 | of 1910 | United Kingdom | 350/286 |

Primary Examiner—Bruce Y. Arnold
Assistant Examiner—Ronald M. Kachmarik
Attorney, Agent, or Firm—Peter A. Taucher; David L. Kuhn

[57] ABSTRACT

Disclosed is an optical for directing radiant energy comprising a pyramidal prism having energy reflective side surfaces. These side surfaces diverge from an imaginary apex on a central axis equidistant from the side surfaces. Within the prism is a pyramidal reflector whose apex is also on the central axis. The reflector has reflective side surfaces faced toward the prism side surfaces, the reflector's side surfaces diverging from the central axis at a different angle than do the prism side surfaces. One embodiment of the optical device creates several relatively concentrated, polarized energy beams from a relatively unconcentrated, unpolarized energy beam.

13 Claims, 7 Drawing Sheets

PRISM WITH INTERNAL REFLECTOR

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to mechanism for directing and/or focusing radiant energy, e.g., visible light, infrared rays, ultraviolet energy or X-ray. The principal aim of the invention is to utilize a pyramidal prism and internal reflector so as to produce multiple light beams or other beams from a single incident beam. In some forms of the invention, the multiple output beams are more concentrated that the incident beam. In some forms of the invention, the multiple output beams are less concentrated than the incident beam.

The invention is believed to have potential usage in several fields, e.g., military target detection, ray focusing, sample melting, x-ray concentration, holography, interferometry, beam splitting, beam polarization, chromatic separation of light beams, solar ray collection, and optical-electrical conversation.

THE DRAWINGS

THE DRAWING IN GREATER DETAIL

FIGS. 1 through 4 illustrate one form of the invention usable to detect the direction taken by radiation impinging on a radiation-transmitting surface of the mechanism. The type of the sensed radiation may be visible (laser) light, infrared, ultra-violet, or x-rays. This form of the invention has potential application in direction-seeking equipment used by the military, e.g., in missiles or in tanks.

Figure 1:
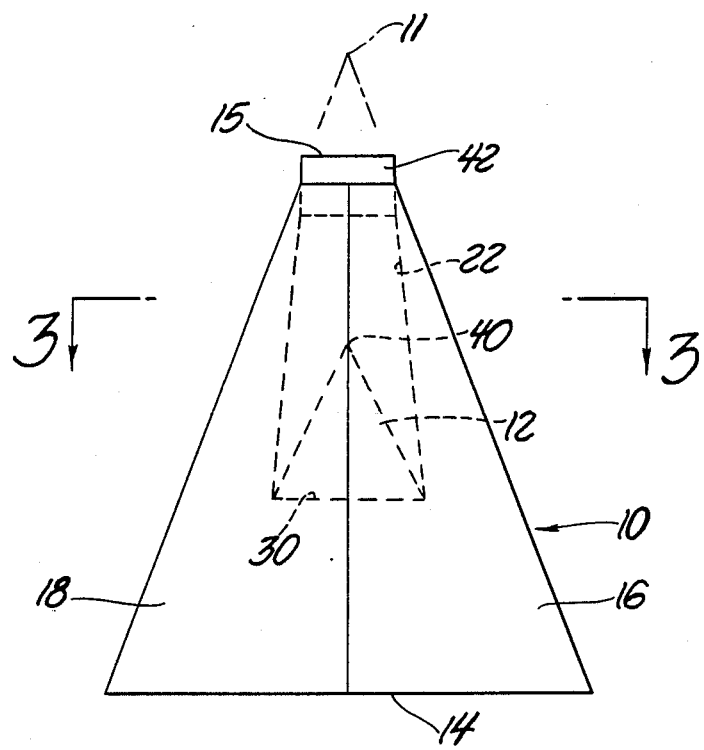
FIG. 1 is a side elevational view of a prism-reflector mechanism embodying my invention.

The FIG. 1 mechanism comprises an outer pyramidal prism designated by numeral 10, and an inner three dimensional reflector designated by numeral 12. The inner reflector is contained within a cavity 22 formed in the outer prism. The prism may be formed of light-transmitting material, e.g., glass or plexiglass or crystalline material to which enhancement coatings may be applied. Enhancement coatings can be used as filters, to aid reflection or to aid diffraction, so as to separate desired wave lengths from other wave lengths in beams manipulated by my apparatus. When used to detect certain types of rays, the reflector 12 can be metallic.

Figure 3:
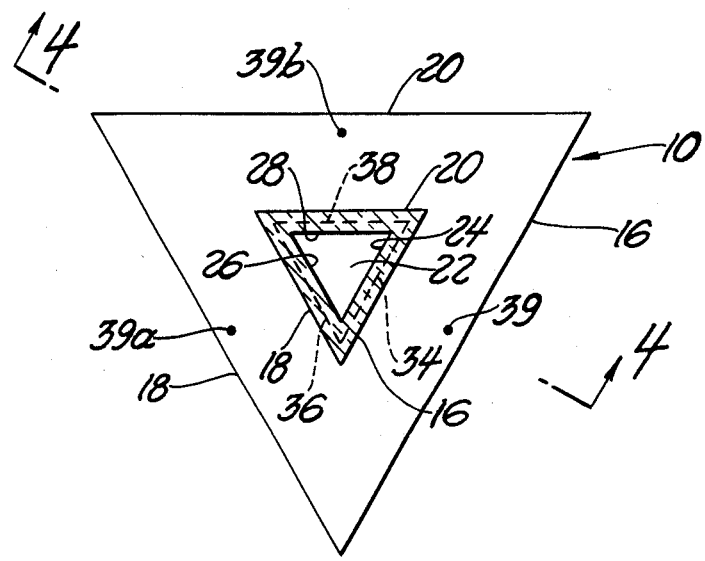
FIG. 3 is a sectional view on line 3—3 in FIG. 1.
Figure 3A:
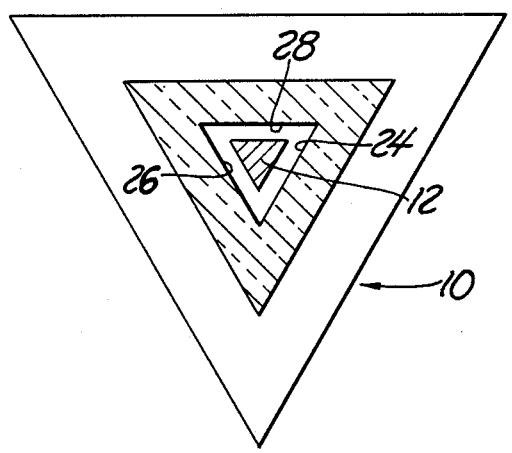
FIG. 3a is a sectional view on line 3a—3a in FIG. 4.

Prism 10 has a relatively large area lower end face 14 of triangular shape, three flat reflective side surfaces 16, 18 and 20, and a small area, upper end face 15 of triangular shape. The side surfaces 16, 18 and 20 are also essentially triangular in shape so that the prism converges upward toward apex 11 in FIG. 1. As seen in FIGS. 1 and 3, the aforementioned cavity 22 has a floor surface 30 and three flat side surfaces 24, 26 and 28. Floor 30 is parallel to prism end face 14. Cavity 22 is of triangular cross section in planes parallel to floor surface 30. Also, cavity 22 is slightly convergent from its lower floor surface 30 to its upper end. A light-transmitting rod or window 42 extends into the upper end of cavity 22; window 42 defines the aforementioned prism end face 15.

The aforementioned three dimensional reflector 12 is oriented within cavity 22 so that its end surface 32 seats against cavity floor surface 30. Reflector 12 is configured as a pyramidal structure having three flat triangular surfaces 34, 36 and 38 terminating in an apex 40. Each side surface 34, 36 and 38 is reflective. In order to operatively locate reflector 12 within prism 10, the prism may be formed in separate sections, which are bonded, molded or glued together after insertion of the reflector into cavity 22. Alternately, the prism can be molded around the reflector.

Figure 4:
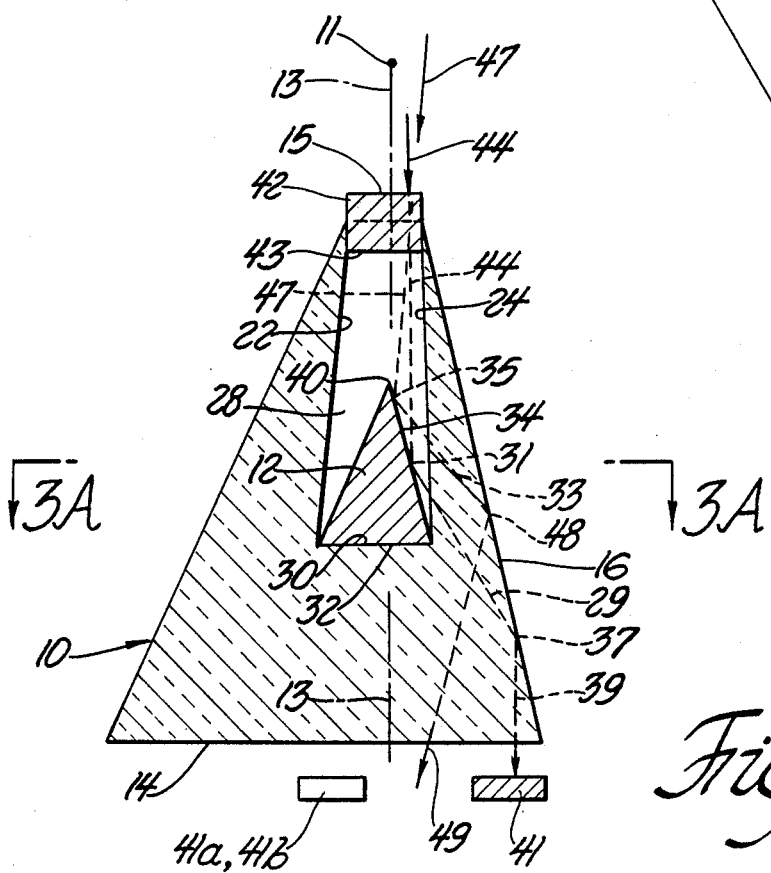
FIG. 4 is a sectional view on line 4—4 in FIG. 3.

FIG. 4 is taken in a vertical (i.e., parallel to axis 13) plane normal to the planes of surfaces 16 and 34; therefore, FIG. 4 shows the true angulations of these surfaces. FIG. 4 does not show the true angulations between surfaces 18 and 26, or between surfaces 20 and 28; however, the angulations would be the same as shown for surfaces 16 and 34 in FIG. 4. Reflector 12 is concentrically disposed within prism 10, i.e., the reflector and prism have a common central axis 13. Also, the reflector and prism are symmetrically oriented such that reflector surfaces 34, 36 and 38 face respective prism surfaces 16, 18 and 20 (as seen FIG. 3).

As best seen in FIG. 4, the reflective side surfaces of reflector 12 diverge from central axis 13 by a slightly greater angle than the prism reflective side surfaces 16, 18 and 20. In the FIG. 4 mechanism side surface 34 has a divergence angle of about fifteen degrees; side surface 16 has a divergence angle or about twelve degrees.

Light rays may be introduced to the prism-reflector system through the aforementioned light-transmitting window 42, which preferably has the same horizontal cross-sectional shape as cavity 22. FIG. 4 shows a representative principal light ray 44 directed normal to end surfaces 43 on window 42, i.e., parallel to the central axis 13 through pyramidal structures 10 and 12. Ray 44 strikes reflective surface 34 at point 31. The reflected ray passes into the prism wall structure along pathline 29 and onto internally reflective surface 16 at point 37 (neglecting refraction within the prism). The ray is reflected along pathline 39 onto an electro-optical radiation detector mechanism 41.

Pathlines similar to pathlines 44, 29 and 39 may be traced onto/off of reflector surfaces 36, 18 and 38, 20. Three distinct rays will emerge from prism end face 14. Thus, the incident radiation on window-surface 15 is split by reflector 12 into three outgoing rays (one of which is shown at 39). With the particular geometry of FIG. 4, the three outgoing rays will be parallel to one another and equidistant from central axis 13. In FIG. 3, the three rays appear as three separated dots, designated by numerals 39, 39a and 39b. Each ray will impinge on a detector mechanism 41, 41a or 41b. When the incoming ray takes a direction parallel to system axis 13, each detector will receive approximately the same amount of radiation.

FIG. 4 shows a second incoming principal ray 47 impinging on rod end surface 15 at a slight angle to axis line 13. The ray will strike reflective surface 34 at point 35. The reflected ray will pass along pathline 33 into the prism material and strike reflective surface 16 at point 48. The ray will emerge from the prism along pathline 49.

Ray 49 will cause detector mechanism 41 to have a changed electrical output, relative to the condition produced by ray 39. At the same time, the other two rays reflected from surfaces 18 and 20 may (or may not) produce changes in the electrical outputs of detector mechanisms 41a and 41b, depending on the angulation of ray 47 in planes normal to reflective surfaces 18 and 20. The electrical changes in the three detector mechanism 41, 41a and 41b can be used to detect the direction taken by incoming ray 47.

FIGS. 1 through 4 show the outer prism 10 and inner reflector 12 as having four major surfaces, i.e., a base (end) surface and three side surfaces. It is possible to form each device with a greater number of side surfaces, e.g., four, five or six. The number of electro-optical detector mechanim 41, 41a, 41b, etc., would correspond to the number of side surfaces used. As the number of side surfaces on each device is increased, the device approaches a conical configuration.

FIGS. 1 through 4 show the so-called normal ray 44 as being operable to produce an emergent ray 39 taking a direction parallel to central axis 13. However, it is possible to have an operable structure in which the emergent ray 39 takes a direction oblique to central axis 13, i.e., by adjusting (changing) the divergency angles for the side surfaces on prism 10 and reflector 12. The location for detectors 41, 41a and 41b are selected in accordance with the expected directions of the emergent rays. The angularities of the reflector 12 surfaces and the prism 10 surfaces determine the ray 39 direction.

Figure 4A:
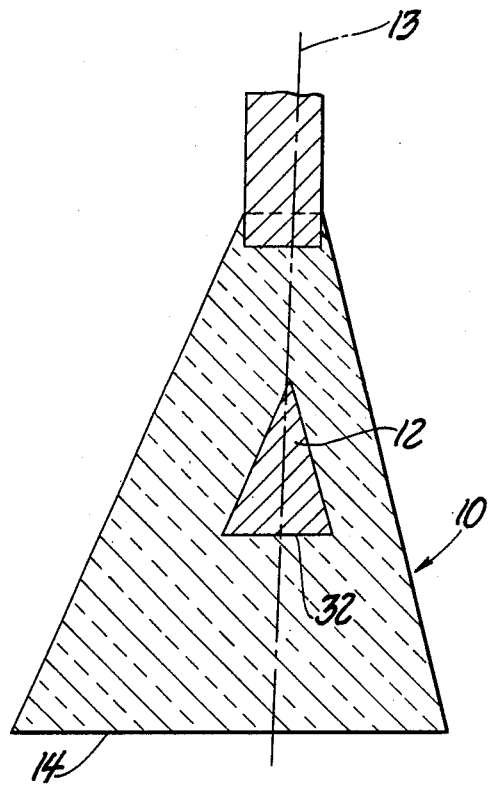
FIG. 4a is a variation of the embodiment shown in FIG. 4.

FIG. 4a shows an embodiment very similar to the FIG. 4 embodiment, except that the FIG. 4a embodiment has no internal cavity. Rather, prism 10 in FIG. 4a is a solid body in which reflector 12 is embedded. Optionally, reflector 12 may be made of the same material as the prism 10 and have a coating on its surface to enhance its reflectivity for particular kinds of radiation, such as x-ray radiation or ultraviolet light radiation. One method of fabricating the FIG. 4 embodiment is by molding the prism around a preformed reflector. I wish it to be understood that a solid prism having no hollows or cavities, and having a reflector embedded therein, may be used in the embodiments of my invention that follow.

It should be noted that prism 10 exhibits the phenomenon known as total internal reflection, so that light rays or other electromagnetic rays striking walls 16, 18 or 20 from inside prism 10 are reflected with almost exactly 100% efficiency. The total internal reflection of prism 12 enhances the intensity of electromagnetic rays emerging from prism 10 at end face 14.

FIGS. 5 AND 6

Figure 5:
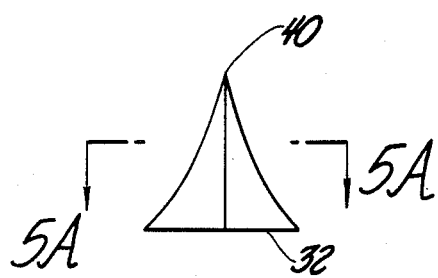
FIG. 5 is a side elevational view of a pyramidal reflector employed in a second embodiment of the invention.
Figure 5A:
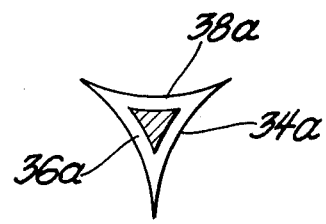
FIG. 5a is a sectional view on line 5a—5a in FIG. 5.
Figure 6:
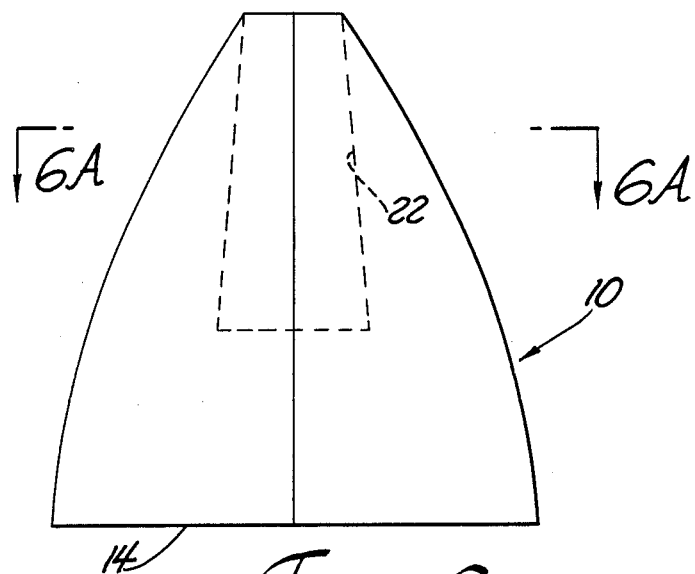
FIG. 6 is a side elevational view of a pyramidal prism used in conjunction with the FIG. 5 reflector.
Figure 6A:
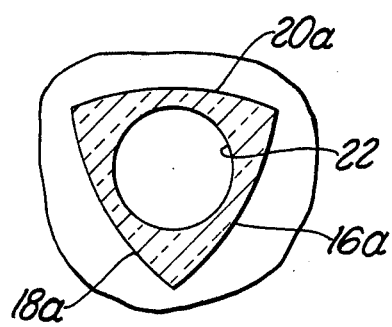
FIG. 6a is a sectional view on line 6a—6a in FIG. 6.

Prism 10 and reflector 12 are shown in FIGS. 1 through 4 as having flat reflective side surfaces. If it is desired to focus each internal ray the prism and reflector can be formed with curved reflective surfaces, as shown in FIGS. 5 and 6. As shown in FIGS. 5a and 6a, the three reflective surfaces 16a, 18a and 20a on reflector 12 are concave, whereas the three reflective surfaces 34a, 36a, and 38a on prism 10 are convex. The surface curvatures can be three dimensional, i.e., curved about horizontal axes as shown in FIGS. 5 and 6, and simultaneously curved about vertical or substantially vertical axes FIGS. 5a and 6a.

A complete device would include the FIG. 5 reflector and the FIG. 6 prism (with the reflector disposed within cavity 22 in the same fashion as depicted in FIGS. 1 through 4). The three emergent rays from the reflector-prism assembly could take directions normal to prism end face 14 or oblique threreto, depending on the reflective angularities of the various reflective surfaces. The curved surface contours on the prism and reflector would focus or concentrate each of the three sets of emergent rays.

FIG 7

Figure 7:
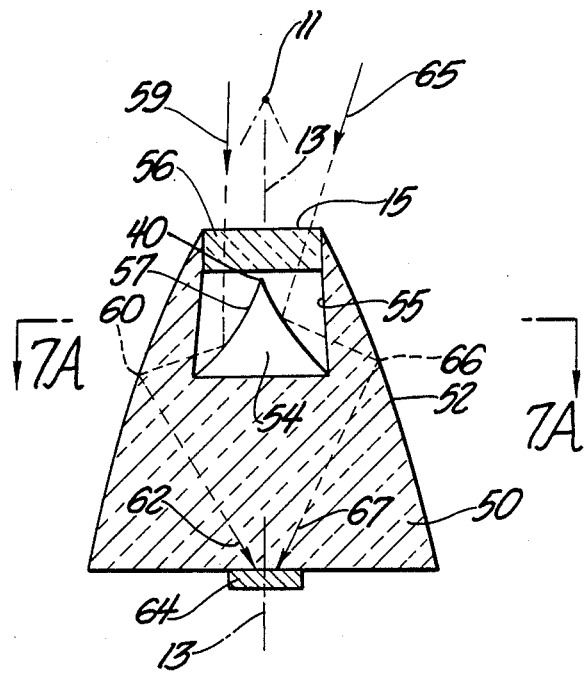
FIG. 7 is a sectional view through a third embodiment of the invention.
Figure 7A:
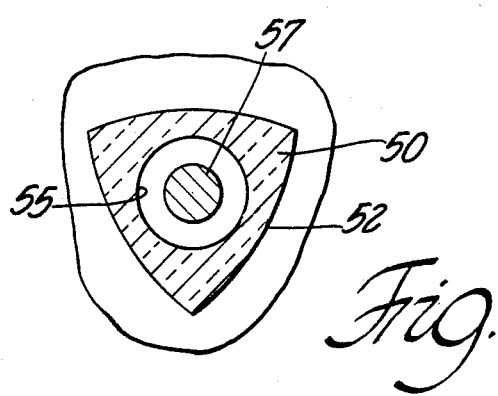
FIG. 7a is a sectional view on line 7a—7a in FIG. 7.

FIG. 7 illustrates a form of the invention designed to focus incident rays onto a single point or zone. The mechanism could be used to measure the intensity of the incoming radiation or to produce a heating action on a specimen located at the focal point or zone 64. One particular usage would be as a solar collector.

The mechanism comprises a pyramidal prism 50 having a side surface 52 shaped similar to surface 16a in FIG. 6a. A generally pyramidal (conical) reflector 54 is disposed within a generally cylindrical cavity 55 within the prism. A light-transmitting rod or window 56 is located within the mouth of the cavity to conduct radiant energy onto the essentially conical surface 57 of reflector 54.

The side surface 57 of reflector 54 has a slightly concave profile when viewed from a point outside reflector 54 near surface 57. The outer side surface 52 of prism 50 is slightly convex when viewed from a point outside prism 50 near surface 52.

FIG. 7 shows a representative incoming principal ray 59 parallel to axis 13. The ray is reflected from surface 57 onto point 60 of surface 52, thence downwardly a long pathline 62 onto target 64. Target 64 could be a photovoltaic cell or a mass of material to be heated (melted) by the ray (e.g., infra-red). Target 64 is located at the focal point of the reflector-prism system. As seen in FIG. 7, the focal point can be any point on axis 13 on or below the base of pyramidal prism 50.

FIG. 7 shows a representative oblique principal ray 65 striking reflector surface 57. The reflected ray passes through the prism to impinge on surface 52 at point 66. The ray is then reflected along pathline 67 onto target 64.

The concave profile of reflective surface 57, together with the convex profile of surface 52, tends to cause target 64 to be more intensely radiated, as compared to the condition that would prevail if these surfaces were planar. The effect is that the system has a wider range of permissible orientations relative to the incoming radiation. The system can be oriented to receive oblique radiation, e.g., along pathline 65, as well as normal radiation, e.g., along pathline 59. Conventional lens systems must be precisely normal to the principal ray from the energy source to achieve high energy concentration on the target. The FIG. 7 system is belived to have a wider field of view and a greater energy-concentration capability than conventional lens systems.

The FIG. 7 mechanism could be used for military target tracking purposes. In such case target 64 could taken the form of a silicon, lateral effect, linear photodiode having four electrical output signals representing X and Y position information referenced to the geometrical center of the photodiode. changes in the direction of incoming laser light would be detected by the photodiode.

FIG. 8

Figure 8:
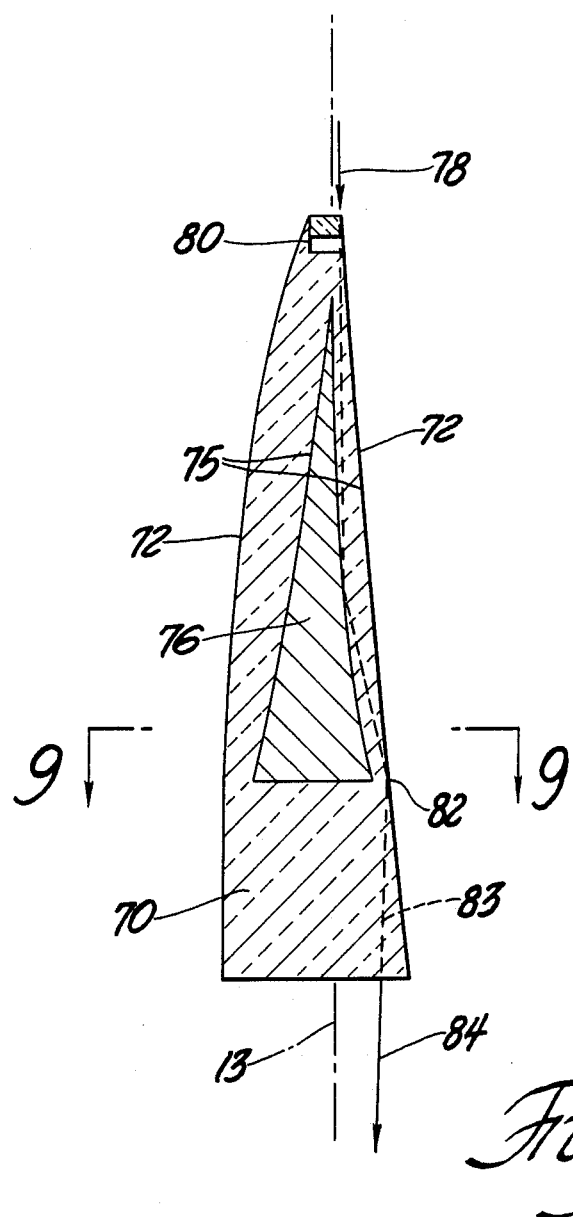
FIG. 8 is a sectional view through another embodiment of the invention.
Figure 9:
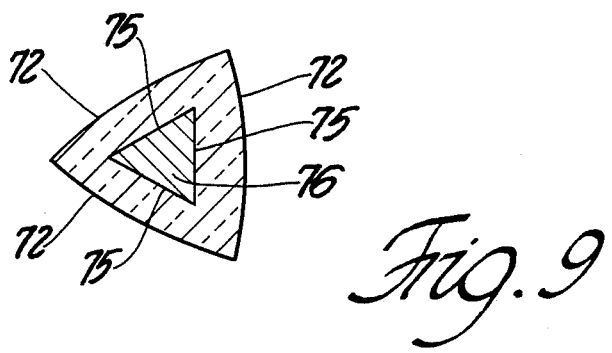
FIG. 9 is a sectional view on line 9a—9a in FIG. 8.

FIG. 8 illustrates a form of the invention designed to focus (concentrate) x-rays. Such rays have very high penetrating power so that they tend to pass through conventional reflectors at approach angles greater than two or three degrees. The FIG. 9 mechanism is designed to use a prism-reflector system in such a way that incident x-rays contract the reflective surfaces at very low approach angles, i.e., near-grazing angles.

The mechanism includes a pyramidal prism 70 having side surfaces. A pyramidal reflector 76 is located within the prism so that a side surface 75 on the reflector deflects incident x-rays onto reflective surface of the prism. The divergence angle of reflector side surface 75 from axis 13 is relatively small, on the order of two or three degrees. The divergence angle of prism surface 72 (relative to axis 13) is about two degrees (i.e., somewhat less than the divergence angle for surface 75).

Numeral 78 designates a representative x-ray passing through entrance window 80 onto the surface 75 of reflector 76. The reflected ray impinges on side surface 72 at point 82, and then travels a long pathline 83 to surface 74. The x-ray emerges from the prism along pathline 84. The emergent ray meets other rays at a focal point (not shown) on an extension of axis 13. The different divergence angles for surfaces 72 and 75 tends to produce a focusing action.

The focusing action of this system could be somewhat enhanced by giving the surfaces 72 and 75 longitudinal curvatures similar to curvatures used in the FIG. 7 system.

FIG. 10

Figure 10:
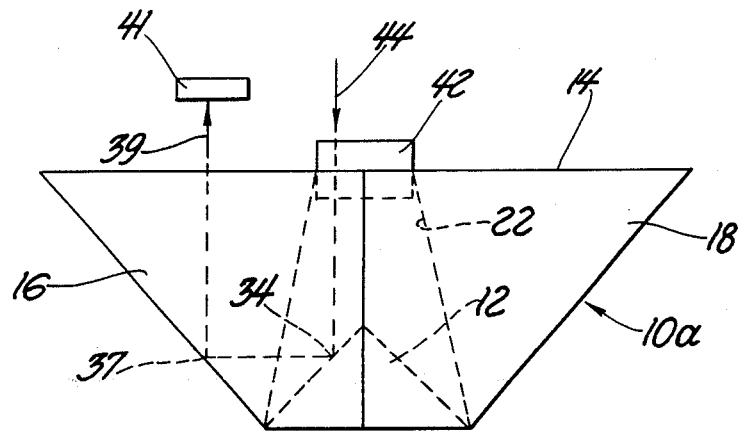
FIG. 10 is a side elevational view through a further embodiment of the invention.

The mechanism shown in FIG. 10 is generally similar to the FIG. 1 mechanism functionally and structurally, except that in the FIG. 10 mechanism, the incident beam and emergent beams pass through the same face of the prism. In FIG. 1, the rays pass through the mechanism (as in a lens), whereas in FIG. 10, the rays reverse direction (as in a reflector). The FIG. 10 mechanism performs the same beam-splitter function performed by the FIG. 1 mechanism.

The FIG. 10 mechanism comprises a prism 10a defining a relatively large area end surface 14 and three flat side faces, two of which are shown at 16 and 18. The third side face is not visible in the drawing. A four-sided pyramidal, flat-faced prism 12 is mounted within the prism to split an incident beam into three separate emergent beams.

A representative principal ray 44 is shown passing through a light-transmitting window 42 to impinge on surface 34 of the reflector. The ray is reflected onto prism surface 16 at point 37, from where it is further reflected along pathline 39 onto a sensor 41. Other similar emergent beams are generated at the other two prism side surfaces.

FIG. 11

Figure 11:
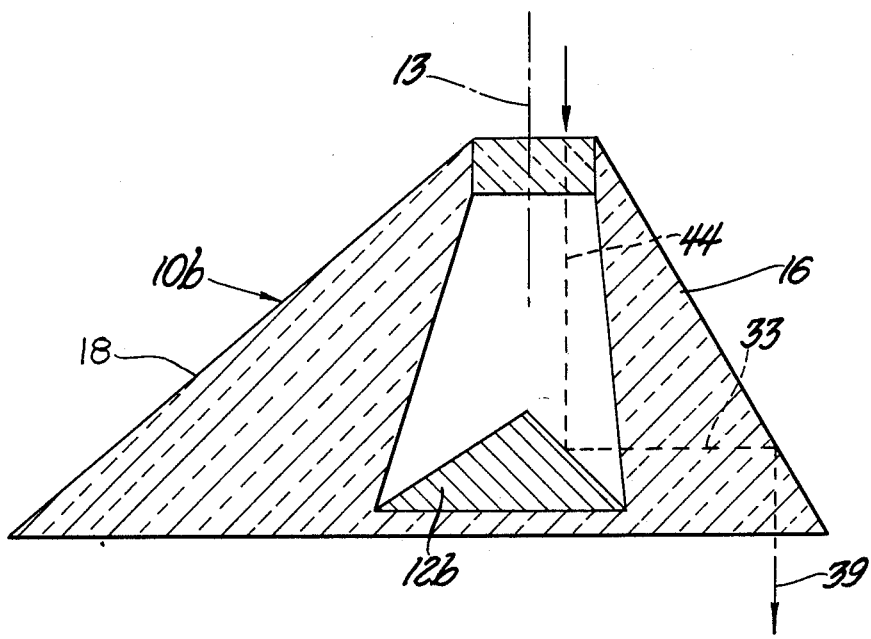
FIG. 11 is a sectional view through an additional embodiment of the invention.

FIG. 11 illustrates a prism-reflector mechanism wherein the pyramidal prism 10b has three flat side surfaces, and the pyramidal reflector 12b has three flat side surfaces centered on a central axis 13; the mechanism is constructed along the lines of the FIG. 1 system. However, in the FIG. 11 arrangement the reflector and prism are each configured to have angularities selected to produce polarized light by means of reflection. The FIG. 11 system is designed so that reflective surfaces are oriented at approximately forty-five degrees to the incident rays. For example, the angle between incoming principal ray 44 and reflected ray 33 is approximately ninety degrees; the angle between ray 33 and emergent ray 39 is also about ninety degrees. Ray 39 is polarized in the plane of the paper (FIG. 11).

The mechanism of FIG. 11 produces three separate plane polarized output beams; each beam has a polarization plane normal to the plane of the associated prism side face 16, 18 or a third prism face not shown in FIG. 11. It should be noted that the embodiments shown in FIGS. 1 through 7a also cause the emerging rays to be polarized.

FIG. 12

Figure 2:
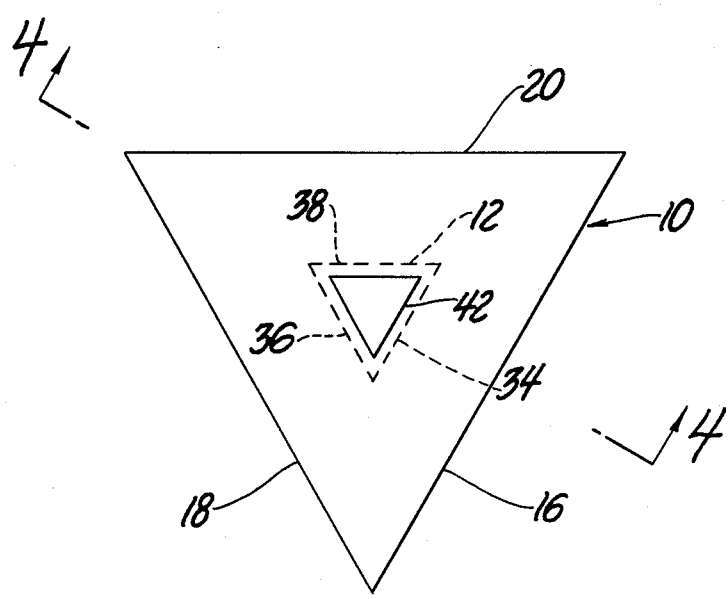
FIG. 2 is a top plan view of the FIG. 1 mechanism.

FIG. 2 illustrates a prism-reflector system suitable for use in chromatography. The system comprises a pyramidal prism 10 having three flat side surfaces 80 equipped with reflective coatings thereon. A pyramidal mirror 12 within the prism has three flat reflective side surfaces 82. The side surfaces of prism 80 and mirror 12 diverge from a central axis 13, in the same general fashion as previously described in connection with other embodiments of the invention.

A source of non-coherent light 84 is arranged to transmit a relatively narrow light beam onto mirror 12 along the central axis 13. The mirror side faces 82 split the beam into three component beams; two of such beams are designated by numerals 86. The component beams are reflected off of prism surfaces 80. As each beam leaves emergent end face 14 its different wavelengths are refracted to different degrees according to the wavelength (color) pattern of the initial light source. At the point on axis 13 where the emergent beams meet there is disposed a sensor 88 responsive to one or more of the wave lengths contained in the light source.

It is believed that since the prism-reflector system produces three wavelength separations (spectrums), sensor 88 will be enabled to provide a more positive (accurate) response than would a sensor exposed to only one multi-wavelength spectrum.

Figure 12:
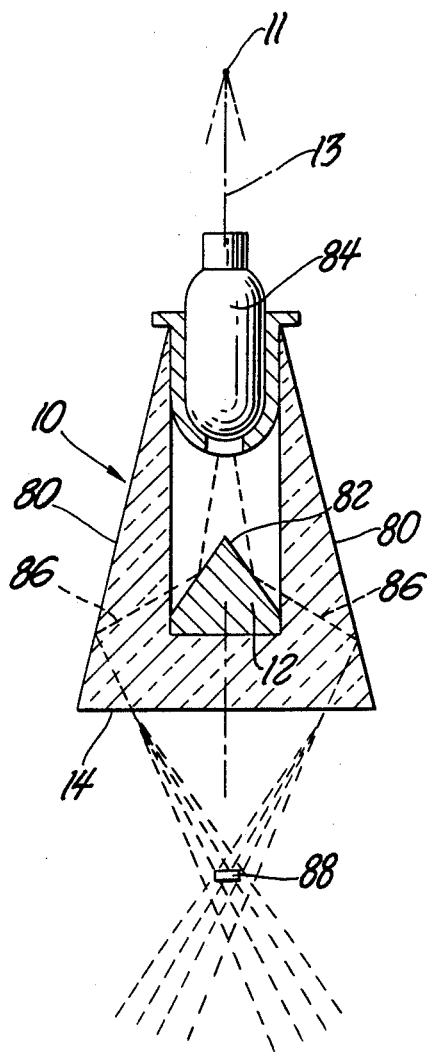
FIG. 12 is a sectional view through another embodiment of the invention.

The light source 84 is shown as a bulb. It could be an incandescent sample undergoing metallurgical testing. The principal advantage of the FIG. 12 arrangement is the enhanced wavelength separation associated with the beam-splitter action of mirror 12 and the refocusing action of prism surfaces 80.

FIG. 13

Figure 13:
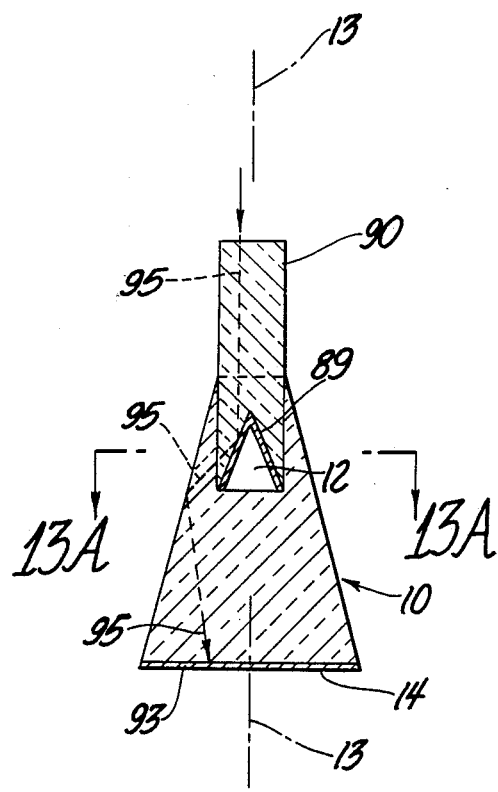
FIG. 13 is a sectional view through a further embodiment of the invention.
Figure 13A:
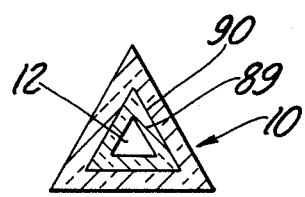
FIG. 13a is a sectional view taken on line 13a—13a in FIG. 13.

FIG. 13 illustrates a mechanism that includes a pyramidal prism 10 and internal pyramidal reflector 12. In this case, the mirror reflective surfaces 89 are formed as reflective coatings applied onto the end surfaces of a light-transmitting rod (window) 90. The reflective surface 89 may be regarded as forming a three-sided, pyramidal depression in the lower end face of rod 90.

End face 14 on prism 10 is coated with a film 93 of optical-electrical conversion material, e.g., an "ovonics" material. Such a material can act somewhat like a battery when exposed to light energy.

With the arrangement of FIG. 13 light rays passing downwardly through rod 90 are reflected by reflective surfaces onto the ovonics coatings 93, as indicated by a representative pathline 95 in FIG. 13.

BEAM SPLITTER ACTION

Various ones of the illustrated systems can be used to achieve beam splitter action. The action is somewhat different than the action that takes place in conventional plate type beam splitters or cube type beam splitters. In the conventional arrangements, the intensity of each output beam is less than the intensity of the source beam. For example, in a typical partial reflector plate system, the intensity of the light passing through the plate might be about forty percent of the intensity of the source light, and the intensity of the reflected light might be about fifty percent of that of the source light; losses within the plate account for the other ten percent.

With the beam splitter action contemplated in the present invention, the intensity of each output beam is the same as that of the source beam. For some situations this would be advantageous.

Another advantage of the described beam splitters is the fact that more than two beams are produced, i.e., three beams, four beams, etc., depending on the number of reflective surfaces on the pyramidal reflector and prism, and the apex angle of the pyramidal prism. Conventional beam splitters produce only two output beams.

I wish it to be understood that I do not desire to be limited to the exact details of construction shown and described for obvious modifications will occur to a person skilled in the art, without departing from the spirit and scope of the appended claims.

I claim:

1. Mechanism for directing radiant energy, comprising a relatively large pyramidal prism having a plural number of energy reflective side surfaces diverging from an imaginary apex that is located on a central axis equidistant from the prism side surfaces; said prism side surfaces having a predetermined angle of divergence from the central axis; and a relatively small pyramidal reflector located within the prism; said pyramidal reflector having a second apex located on the aforementioned central axis; said pyramidal reflector having a plural number of reflective side surfaces diverging from said second apex; the reflector side surfaces having a different angle of divergence from the central axis than the prism side surfaces; said reflector being oriented to the prism so that radiant energy rays are passed between the prism side surfaces and the reflector side surfaces.

2. The mechanism of claim 1 wherein the side surfaces prism and reflector are flat.

3. The mechanism of claim 1 wherein the angle of divergence of the reflector side surfaces is greater than the angle of divergence of the prism side surfaces.

4. The mechanism of claim 1 wherein the reflector side surfaces dish inwardly toward central axis of the reflector.

5. The mechanism of claim 4 wherein the prism side surfaces oppose the reflector side surface, the prism sides being convex relative to the reflector side surfaces.

6. The mechanism of claim 1 wherein the prism has a first relatively small area end face normal to the central axis, and a second relatively large area end face normal to the central axis; at least one of said end faces constituting an entracne face for radiant energy; at least one of said end faces constituting an exit face for radiant energy.

7. The mechanism of claim 6 wherein the small area end face constitutes an entrance face, and the large area end face constitutes an exit face.

8. The mechanism of claim 6 wherein the large area end face constitutes an entrance face and an exit face.

9. The mechanism of claim 6 wherein the large area end face constitutes an entrance face, and the small area end face constitutes an exit face.

10. The mechanism of claim 1 wherein the prism side surfaces intersect a plane normal to the central axis to form curved lines.

11. The mechanism of claim 1 wherein the reflector side surfaces intersect a plane normal to the central axis to define curved lines.

12. The mechanism of claim 1 wherein the prism side surfaces intersect a plane normal to the central axis to form first curved lines and wherein the reflector side surfaces intersect the plane to define second curved lines.

13. A mechanism for directing radiant energy, comprising a relatively large pyramidal prism having a plurality of energy reflective side surfaces diverging from a reference point on a central axis which is equidistant from the prism side surfaces, the prism side surfaces having a predetermined angle of divergence from the central axis, the mechanism further having a relatively small conical reflector within the prism, said conical reflector having an apex on the central axis and a reflective surface encircling the central axis, the reflective surface having a different angle of divergence from the central axis than the prism side surfaces, the conical reflector being oriented within the prism so that radiant energy rays are directed between the prism side surfaces and the conical reflector.

* * * * *